(12) United States Patent
Wang et al.

(10) Patent No.: US 9,848,400 B2
(45) Date of Patent: Dec. 19, 2017

(54) METHOD AND APPARATUS FOR CONTEXT AWARE NEIGHBOR DISCOVERY IN A NETWORK

(71) Applicant: Convida Wireless, LLC, Wilmington, DE (US)

(72) Inventors: Chonggang Wang, Princeton, NJ (US); Lijun Dong, San Diego, CA (US); Shamim Akbar Rahman, Quebec (CA); Quang Ly, North Wales, PA (US); Xu Li, Plainsboro, NJ (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/317,428

(22) PCT Filed: Jun. 12, 2015

(86) PCT No.: PCT/US2015/035544
§ 371 (c)(1),
(2) Date: Dec. 9, 2016

(87) PCT Pub. No.: WO2015/191995
PCT Pub. Date: Dec. 17, 2015

(65) Prior Publication Data
US 2017/0127370 A1    May 4, 2017

Related U.S. Application Data

(60) Provisional application No. 62/011,338, filed on Jun. 12, 2014.

(51) Int. Cl.
*H04W 4/00* (2009.01)
*H04W 60/00* (2009.01)
(Continued)

(52) U.S. Cl.
CPC ............ *H04W 60/00* (2013.01); *H04L 41/12* (2013.01); *H04W 4/005* (2013.01); *H04W 4/008* (2013.01);
(Continued)

(58) Field of Classification Search
None
See application file for complete search history.

(56) References Cited

U.S. PATENT DOCUMENTS

| | | | | |
|---|---|---|---|---|
| 2004/0103282 A1* | 5/2004 | Meier | ................ | G06Q 20/3674 713/171 |
| 2012/0084568 A1* | 4/2012 | Sarikaya | ............... | H04L 9/3066 713/176 |

FOREIGN PATENT DOCUMENTS

| | | |
|---|---|---|
| EP | 2 922 3231 A1 | 9/2015 |
| WO | WO 2014-075502 A1 | 5/2014 |

OTHER PUBLICATIONS

Manner, J., "Coupling of Service and Neighbor Discovery in 6LowPAN draft-Manner-610wapp-sdnd-00.txt", Network Working Group, Internet-Draft, Oct. 19, 2009, 7 pages.

(Continued)

*Primary Examiner* — Idowu O Osifade
(74) *Attorney, Agent, or Firm* — Baker & Hostetler, LLP

(57) ABSTRACT

The present application describes a computer-implemented method for discovering a router on a network. The method includes a step of determining whether to discover the router. Next, a message is sent to the router including context information. Further, a message is received from the router including router specific context information. The application also describes an endpoint device for discovering a router on a network.

20 Claims, 12 Drawing Sheets

(51) Int. Cl.
H04W 60/06 (2009.01)
H04W 8/22 (2009.01)
H04W 48/10 (2009.01)
H04L 12/24 (2006.01)

(52) U.S. Cl.
CPC .............. *H04W 8/22* (2013.01); *H04W 48/10* (2013.01); *H04W 60/06* (2013.01)

(56) References Cited

OTHER PUBLICATIONS

Shelby et al, "Neighbor Discovery Optimization for Ipv6 Over Low-Power Wireless Personal Area Networks (6LoWPANs)" Internet Engineering Task Force (IETF), RFC 6775, Nov. 2012, 55 pages.

Butt et al, "TRENDY: An Adaptive and Context-Aware Service Discovery Protocol for 6LoWPANs", WoT, Jun. 1, 2012, http://www.webofthings.org/wot/2012/papers/pervasive_WoT2012_Paper4.

Conta et al, "Internet Control Message Protocol (ICMPv6) for the Internet Protocol Version 6 (Ipv6) Specification", Network Working Group, RFC 4443, Mar. 2006, 24 pages.

Hinden, R. "IP Version 6 Addressing Architecture", Network Working Group, RFC 4291, Feb. 2006, 25 pages.

Hui, J., and Thubert, P., "Compression Format for Ipv6 Datagrams over IEEE 802.15.4-Based Networks", RFC 6282, Sep. 2011, 24 pages.

IEEE Standard for Local and metropolitan area networks—"Part 15.4: Low-Rate Wireless Personal Area Networks (LR-WPANs) Amendment 1: MAC sublayer", IEEE Computer Society, Std 802.15.4e™-2012, Apr. 16, 2012, 225 pages.

Kim et al, "Design and Application Spaces for Ipv6 over low-Power Wireless Personal Area Networks (6LoWOANs)", Internet Engineering Task Force (IETF), RFC 6568, Apr. 2012, 28 pages.

Montenegro et al, "Transmission of Ipv6 Packets Over IEEE 802.15.4 Networks", Network Working Group, RFC 4944, Sep. 2007, 30 pages.

PCT Patent Application No. PCT/US2015/035544: International Search Report and the Written Opinion dated Aug. 24, 2015, 16 pages.

Shelby et al, "Neighbor discovery Optimization for Ipv6 over Low-Power Wireless Personal Area Networks (6LoWPANs)", Internet Engineering Task Force (IETF), RFC 6775, Nov. 2012, 55 pages.

Wang, C., "Smart IoT Protocols" IEEE, Global Communications Conference Exhibition & Industry Forum, Dec. 8-12, 2014, Austin, Texas, Dec. 8, 2014, 24 pages.

www.iana.org, "Internet Control Message Protocol Version 6 (ICMPv6) Parameters", Jan. 27, 2017, 8 pages, http://www.iana.org/assignments/icmpv6-parameters/icmpv6-parameters.xhtml.

* cited by examiner

METHOD AND APPARATUS FOR CONTEXT AWARE NEIGHBOR DISCOVERY IN A NETWORK

CROSS-REFERENCE TO RELATED APPLICATIONS

This application is the National Stage of International Application No. PCT/US2015/035544 filed Jun. 12, 2015, which claims priority from U.S. Provisional Patent Application No. 62/011,338, filed Jun. 12, 2014, the disclosures of which are incorporated herein by reference in their entirety.

CROSS-REFERENCE TO RELATED APPLICATIONS

This application claims priority from U.S. Provisional Patent Application No. 62/011,338, filed Jun. 12, 2014, the disclosure of which is incorporated herein by reference in its entirety.

BACKGROUND

Inefficient protocol overhead and energy consumption are just some of the byproducts of today's 6LoWPAN Neighboring Discovery (ND) protocols. These byproducts are likely attributed to at least two factors. First, existing 6LoWPAN ND protocols focus on router discovery and node address registration to facilitate IP connectivity to nodes. Second, existing 6LoWPAN ND protocols follow a separation of layer principle whereby nodes and routers in the same network are unaware of each other's service features or information in higher layers. Therefore, while a node may discover and attach to another node or router in the network, limited information of a network IPv6 address prefix and neighbor's address may result in a mismatch between nodes and routers. As such, additional procedures and time are required to find an appropriate node or router which can accommodate the expected services such as optimized ND functions or data aggregation functions. Moreover, a router may provide IP connectivity to a node and yet fail to provide the latter with desired services including, for example, a mobility function, and temperature or sensor information.

Router redirect is a problem in the field of networking Namely, there does not appear to be a methodical architecture on how a current router selects a target router given lack of coordination or authentication between them. Thus, the target router selected by the current router may be inappropriate for the expected services of a specific node.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and apparatus for load balancing packets among plural nodes in a network.

One aspect of the application is directed to a computer-implemented method of discovering a router on a network. First, it may be determined whether to discover the router on the network. Next a message is sent to the router including context information. In one embodiment, the context information may include supported services on an endpoint device, supported functions on the endpoint device, desired services from a router, desired functions from a router, location information of the endpoint device, and location information of the router. A further step includes receiving a message from the router including router context information.

In another embodiment, there is a step of determining whether to add the router context information to a database. In yet another embodiment, there is a step of sending a second message to the router including registration start time information and/or registration lifetime information. In yet another embodiment, there is disclosed a step of receiving a cancelation message from the router including context information of a second router. In yet even another embodiment, there is disclosed a step of sending a message to the router agreeing to delegation with the second router. In a further embodiment, a step of receiving a redirect message from the endpoint device.

According to another aspect of the application, an endpoint device for discovering a router on a network is disclosed. The endpoint device includes a non-transitory memory having instructions stored thereon for discovering a router on a network. The endpoint device also includes a processor that is operatively coupled to the memory. The processor is configured to perform the instructions of sending a message including context information to the router. In one embodiment, the memory of the endpoint device includes a database for storing the context information therein. In another embodiment, the endpoint device includes a transceiver.

There has thus been outlined, rather broadly, certain embodiments of the invention in order that the detailed description thereof may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION

Figure 1:
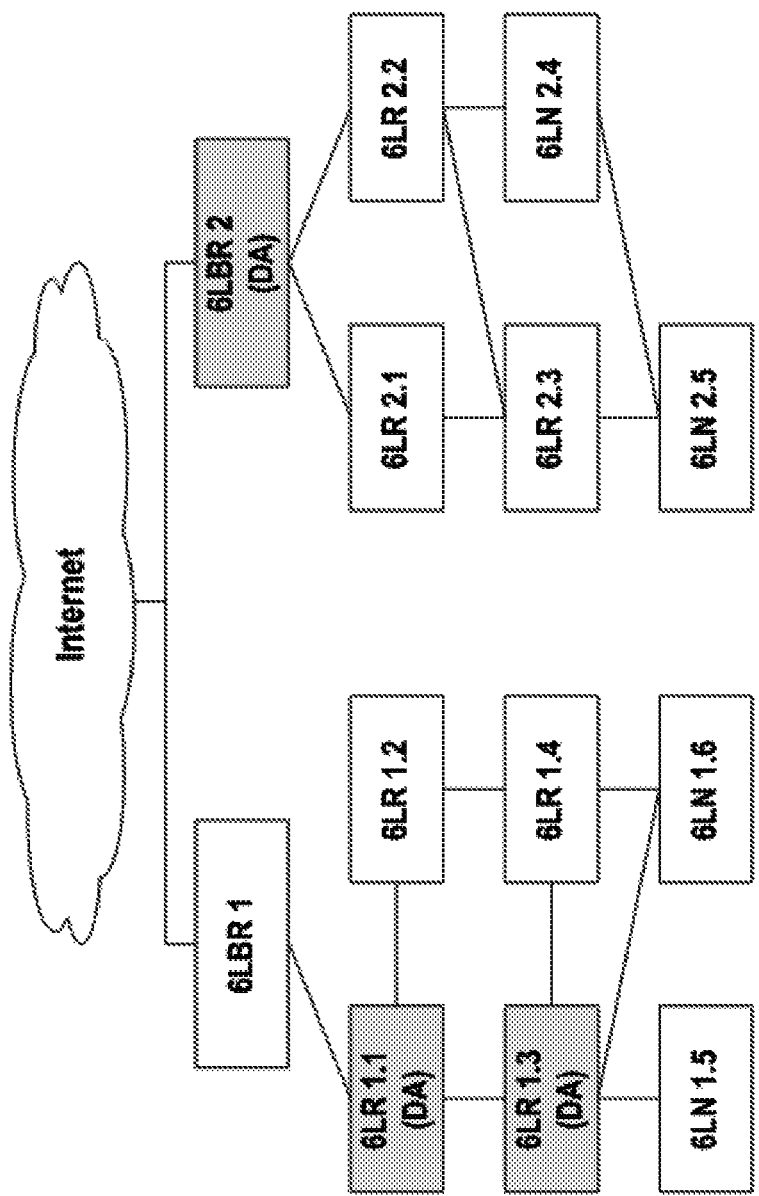
FIG. 1 illustrates an embodiment of 6LoWPAN employed in industrial monitoring.

A detailed description of the illustrative embodiment will be discussed in reference to various figures, embodiments and aspects herein. Although this description provides detailed examples of possible implementations, it should be noted that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present application describes new ways of enhancing existing 6LoWPAN ND protocols based upon Context-Aware Neighbor Discovery (CAND). In particular, the application describes CAND procedures where selected context information may be exchanged during router discovery, address registration, address de-registration and/or router redirect procedures. Service information including the list of supported services, the desired services to be discovered, and/or service security key may be exchanged. The service information may also be piggybacked in existing ND messages.

In one embodiment, a Context Information Option (CIO) is disclosed whereby context information is incorporated into an existing Router Solicitation (RS), Router Advertisement (RA), Node Solicitation (NS), Node Advertisement (NA) and Redirect message(s). The CIO enables context-aware router discovery, context-aware address registration, context-aware address de-registration and context-aware router redirect/delegation. In an alternative embodiment, Context Information Solicitation (CIS) and Context Information Advertisement (CIA) messages are proposed as two Internet Control Message Protocol (ICMP) messages to facilitate aperiodic or periodic context information exchange between 6LNs, 6LRs, and/or 6LBRs. Among other things, both approaches reduce and/or eliminate high-layer protocol header overhead.

In one aspect of the application, context-aware router discovery may be performed whereby context information, such as for example, supported services at routers, are exchanged between the router and constrained nodes inclusive of routers to locate suitable routers and constrained nodes. In another aspect of the application, context-aware address registration may be performed where context information, such as for example, registration start time is exchanged between the router and the constrained node to improve address registration performance. In yet another aspect of the application, context-aware address de-registration may be performed where the current router performs address de-registration and piggybacks context information, such as for example, next registration time. In a further aspect of the application, context-aware router delegation may be performed for redirecting authorization between a current router and a target router whereby context information such as registration start time, lifetime, etc. is exchanged between the current and target routers.

Protocols

In the field of networking, 6LoWPAN is commonly known as IPv6 over low power wireless personal area networks. That is, 6LoWPAN is a version of the IPv6 networking protocol suitable for resource constrained Internet of Things (IoT) devices. Moreover, a 6LOWPAN network could have routing performed at or above the Medium Access Control (MAC) Layer. "Route-over" is understood to be a routing mechanism which occurs above the MAC layer. "Mesh under" is understood to be a routing mechanism which occurs at the MAC layer.

One of the main features of IPv6 is its Neighbor Discovery (ND) protocol. The ND protocol is employed for tasks such as address resolution, address auto configuration, router discovery and neighbor reachability. The ND protocol allows constrained nodes or devices to locate a neighboring router and connect to the 6LoWPAN. In accordance with this application, network nodes are understood to be endpoint devices or routers unless expressly stated otherwise. These network nodes use IPv6 ND to determine the link-layer addresses for neighbors and to quickly purge cached values that become invalid. Network nodes may also employ the ND protocol to keep track of which neighbor nodes are reachable in addition to neighbor nodes that are not. The ND protocol may also assist in detecting changed link-layer addresses. As such, the ND protocol may be considered a single-hop routing and discovery protocol.

The five types of transmitted ICMP message packets in the ND protocol will be described below. Specifically, Router Solicitation (RS) is a request to a router to generate a Router Advertisement (RA) immediately instead of at its next predetermined time. RA is an advertisement of its presence together with various link and network parameters either periodically or in response to a RS. RAs include prefixes that are used for determining whether another address shares the same link (on-link determination) and/or address configuration, a suggested hop limit value, etc. A Neighbor Solicitation (NS) is sent by a node to determine the link-layer address of a neighbor, or to verify that a neighbor is still reachable via a cached link-layer address. A NS is also used for Duplicate Address Detection (DAD). A Neighbor Advertisement (NA) is a response to an NS. According to the application, a node may also send unsolicited NAs to announce a link-layer address change.

In one embodiment, a route-over 6LoWPAN network may include a 6LoWPAN Border Router (6LBR), 6LoWPAN Routers (6LRs), and 6LoWPAN Nodes (6LNs). Generally, a 6LBR is located at the junction of separate 6LoWPAN networks or between a 6LoWPAN network and another IP network. One or more 6LBRs may be present at the 6LoWPAN network boundary. A 6LBR is responsible for IPv6 prefix propagation in the present 6LoWPAN network. An isolated 6LoWPAN may also contain a 6LBR in the network which provides the prefix(es) for the isolated network. A 6LR is an intermediate router in the 6LoWPAN which sends and receives RAs and RSs. The 6LR also forwards and routes IPv6 packets. Further, a 6LN is any host or router participating in a 6LoWPAN. The 6LN may connect to one or more 6LRs.

The present application describes a few scenarios for employing 6LoWPANs, such as for example, industrial monitoring, structure monitoring, connected home, healthcare, vehicle telematics, and agricultural monitoring. Each scenario has different characteristics in terms of deployment, network size, power source, connectivity, multi-hop communications, traffic pattern, mobility, Quality of Service (QoS), etc. These characteristics may differ for various 6LBRs, 6LRs, 6LNs. These characteristics may be understood as context information. In one example, a 6LoWPAN network deployed in roads, vehicles, and traffic signals for vehicular telematics may include pre-planned deployment, a hybrid power source, ad hoc and multi-hop communications, high mobility for vehicles and no mobility for roadside infrastructure.

In an embodiment, industrial monitoring may be applied to specific applications including, for example, process monitoring and control machine surveillance, supply chain management and asset tracking and storage monitoring. In process monitoring and control, advanced energy metering and sub-metering technologies are included with wireless sensor networking to optimize factory operations, reduce peak demand, ultimately lower costs for energy, avoid machine downtimes, and increase operation safety. In machine surveillance, product quality and efficient and safe equipment operation are ensured. Namely, critical equipment parameters such as vibration, temperature, and electrical signature are analyzed for abnormalities that are suggestive of impending equipment failure. In supply chain management and asset tracking, early detection of inadequate storage conditions with respect to temperature will help mitigate the risk and cost of removing products from the sales channel. This may include, for example, container shipping, product identification, cargo monitoring, distribution, and logistics. Storage monitoring includes sensor systems which are designed to prevent releases of regulated substances into ground water, surface water, and soil. This may also include theft/tampering prevention systems for storage facilities or other infrastructure, e.g., pipelines.

As illustrated in FIG. 1, 6LN1.5, 6LN 2.5, e.g., temperature sensors and humidity sensors, may be deployed, for example, to monitor temperature and humidity in rooms of a hospital. Each room or floor may be configured with a 6LBR, e.g., 6LBR1 or 6LBR2, to connect the sensor networks to the Internet. The data generated from those sensors can be aggregated at some nodes including a Data Aggregator (DA) function, e.g., 6LR1.3 (DA). In one example, however, if the data represents a critical event, it may not be aggregated but directly transmitted to 6LBR1 and the Internet. As shown, a 6LN, e.g., 6LN1.6, is connected to plural 6LRs, e.g., 6LR1.3 and 6LR1.4.

Context Information Exchange

CAND is proposed to enable context awareness in the entire ND process including router discovery, address registration, address de-registration, and router redirect/delegation. Although context information may be piggybacked during router discovery, address registration, address de-registration, and/or router redirect according to context information option (CIO), there may be instances where its size simply is too large to be piggybacked in a single ICMP message. Separately, the CIO could make the entire ICMP message extremely large. Instead, context information may be exchanged between a 6LN and a 6LR, between a 6LN and a 6LBR, between two 6LNs, between two 6LRs, and/or between a 6LR and a 6LBR in a periodic or aperiodic manner based on dedicated Context Information Solicitation (CIS) and Context Information Advertisement (CIA) ICMP messages.

According to the CIO, a standard type-length-value structure may be employed. Here, the type is for example, an 8-bit field as used in other ND options. As to length, this refers to the entire length of the CIO. The length may be fixed by the value. The value is a complex field including multiple context blocks which contains different context information. Each context block consists of context type, context owner, context length, context lifetime, context value. The context type indicates the type or name of the context information. The context owner indicates the MAC address, IP address, or other identifiers of 6LNs, 6LRs, or 6LBR that this context information describes about. The context length indicates the length of this context block.

In addition, the context lifetime indicates the lifetime for which the context block remains valid. That is, the 6LR and 6LN do not need to piggyback a context block for every ND message if the lifetime has not yet expired. This helps reduce overhead. If the context lifetime is zero, the context value of this context block is understood to be constantly changing. As such, the lifetime is likely piggybacked on a message.

The context value indicates the value of the context information as denoted by the "context type." The value may be in different formats, e.g., string, integer, etc.

On the other hand, CIS or CIA messages have the following format. The ICMP Header includes threes 3 fields, e.g., Type, Code, and Checksum. The "Type" has 8 bits with values within the range 0-255. Values 102-126 and 159-199 are currently unassigned according to the latest ICMP parameter allocation and one value from those two ranges may be allocated for CIS. The 8-bit "Code" is set to zero.

ICMP Payload of a CIS message includes parameters such as context type as discussed above. One CIS message could contain more than one Context Type to solicit multiple pieces of context information. ICMP payload of a CIA message includes one or more context blocks. The context value contained in each context block may also be in different formats, e.g., string, integer, etc., and be dependent upon the "context type."

Location information may be employed for both CIO and CIS/CIA messages. This may include a physical location, e.g., Global Positioning System (GPS) coordinates, civil address, e.g., street name and number, highway section, and/or indoor address, e.g., floor number, room number, of 6LNs, 6LRs, and/or 6LBRs. Location information may either be an exact location or a location region/grid/circle.

A list of Supported Services/Functions may also be employed for both CIO option and CIS/CIA messages. These supported services are about a 6LN, a 6LR, and/or a 6LBR. For example, a 6LR may support different versions or modes of ND, e.g., conventional ND, efficiency-aware ND, etc. A 6LR may also support mobility function, a data aggregation function, etc. The following parameters are proposed for each supported services:

i. The number of neighbors for each supported service: Node A could support 5 services and have 5 neighbors. Each neighbor however only supports one different service. In this case, the number of neighbors for each of those 5 supported services is one.

ii. The service popularity: Measured based upon the traffic and/or the number of involved nodes in the past for this particular service. Some fields in IPv6 header, e.g., Flow Label and Traffic Class, can be leveraged to identify packets from different services and measure the corresponding traffic. Generally, more traffic and/or more involved nodes results in higher service popularity.

The context database may also include a list of Desired Services/Functions. The feature indicates expected services to be provided by a 6LN, a 6LR, and/or a 6LBR. For example, a 6LN may look for 6LRs which support data aggregation functions or 6LRs which have a certain remaining battery life. A 6LR may look for 6LNs which provide temperature service. Each service may be represented by a well-known service identification/type/category or a service description keyword.

The context database may also include information such as the 'Next RA Time'. This feature indicates the time when a 6LR immediately sends the next RA message.

The Context Database may also include information such as the 'Next RS Time'. This feature indicates the time when a 6LN immediately sends the next RS message.

The Context Database may also include information such as the 'Current Neighbors'. This feature indicates the number of neighbors, e.g., 6LNs, currently attached to a 6LR.

The Context Database may also include information such as the 'Maximum Neighbors'. This feature indicates the maximum number of neighbors, e.g., 6LNs, that a 6LR can accommodate.

The Context Database may also include information such as 'Capability'. This feature indicates static capability or profile of a 6LN, a 6LR, or a 6LBR. The static capability may include, for example, power category, storage size, communication capability, remaining power lifetime, etc.

The Context Database may also include information such as 'Mobility'. This feature indicates the mobility information of a 6LN, a 6LR, or a 6LBR. The mobility information may include moving speed, moving direction, etc.

Figure 2:
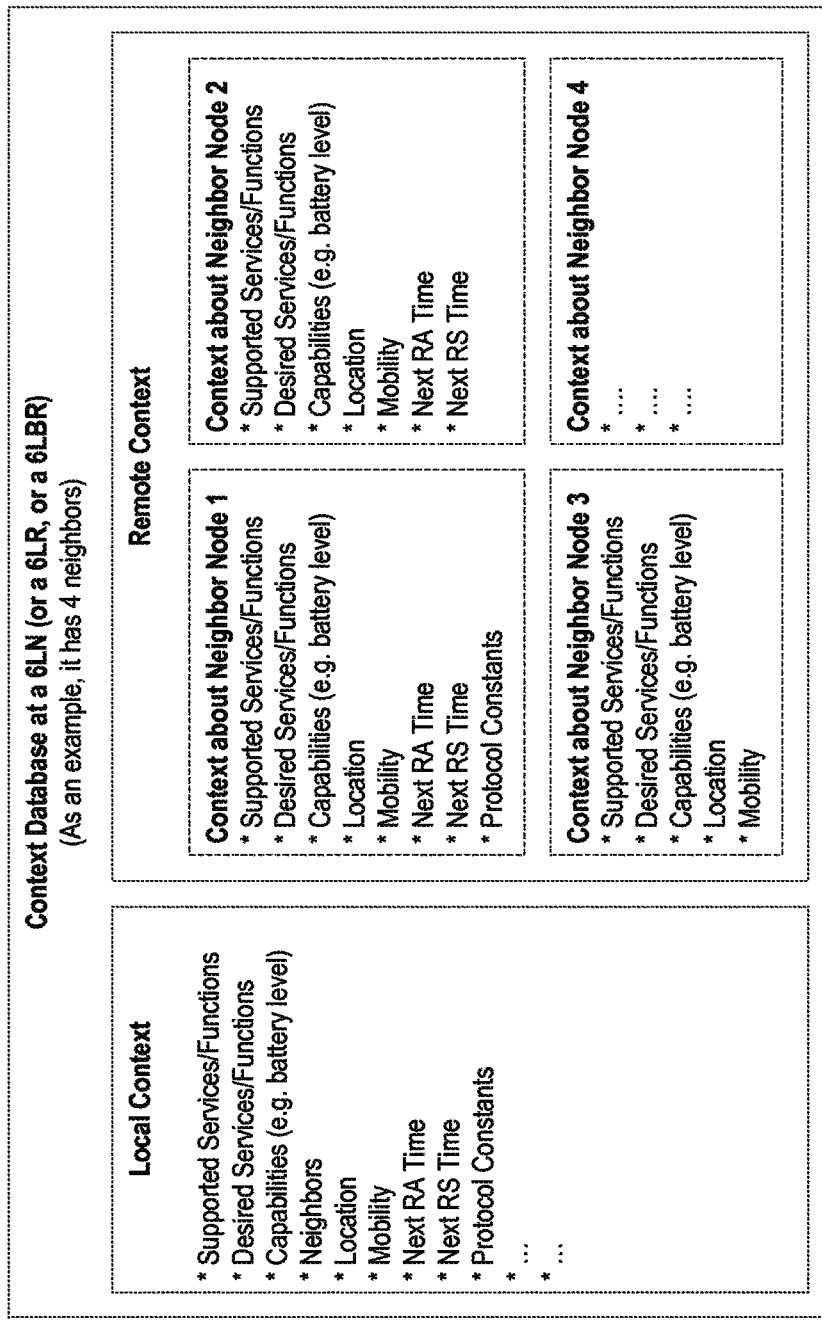
FIG. 2 illustrates an embodiment of a context database at a 6LoWPAN Node (6LN), a 6LoWPAN Router (6LR), or a 6LoWPAN Backbone Router (6LBR).

Each 6LN (or a 6LR, or a 6LBR) will maintain a Context Database to be leveraged for enhancing ND protocol. As illustrated in FIG. 2, the Context Database may contain: (i) local context information about the 6LN (or a 6LR, or a 6LBR); and (ii) remote context information about its neighbors. The local context and remote context information may contain all or partial context information as described above.

Figure 3:
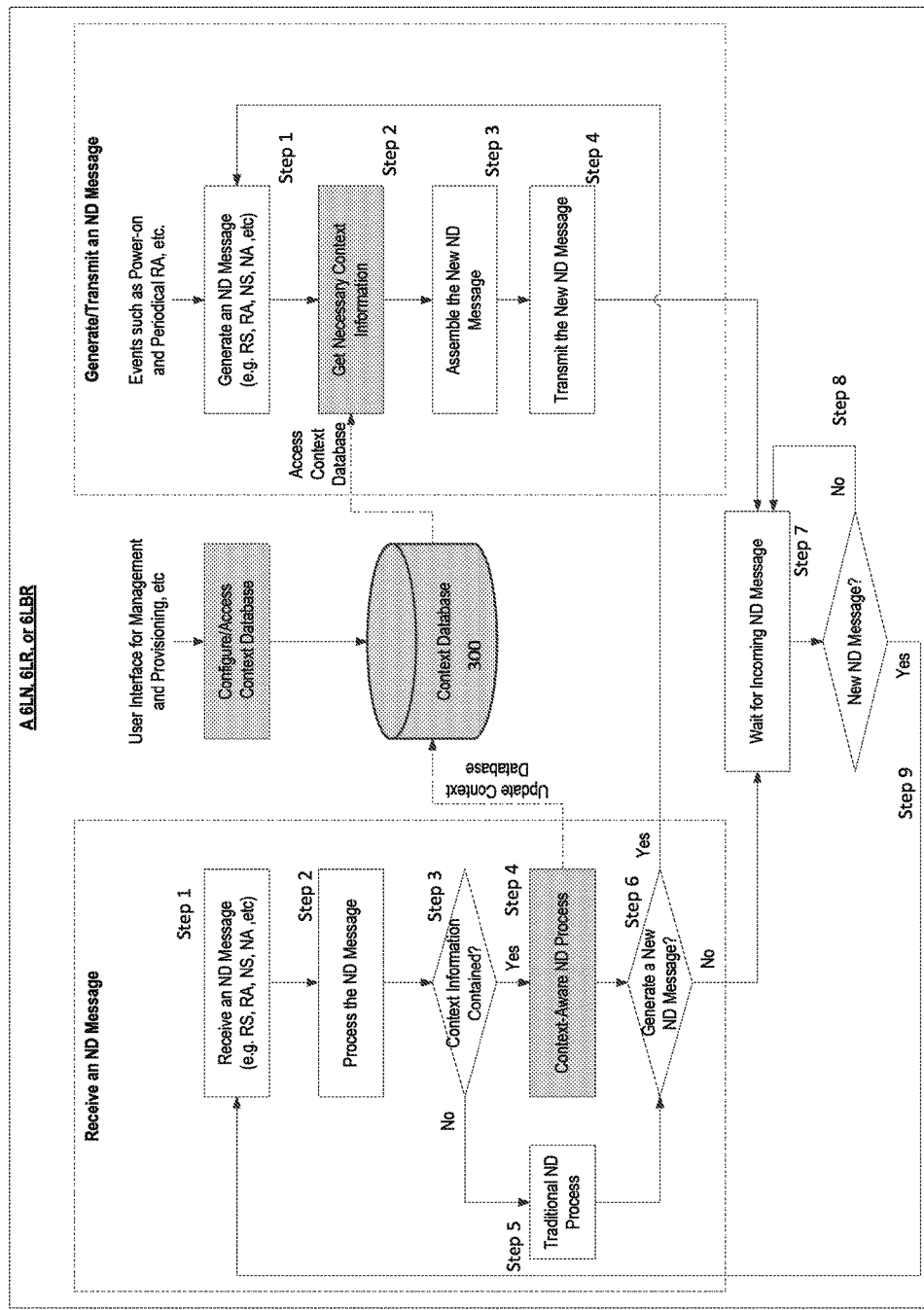
FIG. 3 illustrates an embodiment of a context aware ND process.

As shown in FIG. 3, when sending a ND message, e.g., a RA, a RS, a NS, a NA, etc., the 6LN (or a 6LR, or a 6LBR) may access its Context Database 300 to search and retrieve certain local context information and piggyback it in the ND message to be transmitted. An example of Context Database is illustrated in FIG. 2. On the other hand, when receiving a ND message, e.g., a RA, a RS, a NS, a NA, etc., the 6LN (or a 6LR, or a 6LBR) will extract context information, if any, contained in the ND message and may update its Context Database 300 with remote context information about the neighbor which sent the ND message. As shown in FIG. 3, the Context Database 300 may be configured or accessed via a user interface for management and provisioning. For example, context information on "Desired Services/Functions" may be configured and dynamically changed via the user interface. In addition, current context information, especially the remote context information about neighbors in the Context Database 300, may be accessed and displayed via the user interface.

As shown in the embodiment depicted in FIG. 3, in the dotted box labeled "Receive an ND Message, a ND Message is received (Step 1) and processed (Step 2) by a 6LR or 6LBR to see if it contains context information. If the ND message contains context information, context-aware ND process will be triggered (Step 3). As a result, the Context Database 300 may be updated with new context information as contained in the ND message (Step 4). If the ND message does not contain any context information, traditional ND processes will be triggered (Step 5). Subsequently, the 6LN (or a 6LR, or a 6LBR) will decide if a new ND message needs to be generated (Step 6). That is, if the 6LN receives a RA message, it may need to generate an NS message for address registration. Separately, if the 6LR receives a RS message, it may need to generate a RA message as a response.

FIG. 3 also depicts how to generate/transmit an ND Message in another dotted box. Several events can trigger the 6LN (or a 6LR, or a 6LBR) to generate a ND message. These events may include, for example, "power-on" to send a RS message; periodical RA message to be sent by a 6LR; generate an NS message after receiving a RA message at a 6LR; and generate an NA message after receiving a RS message at a 6LBR (Step 1). Then, the 6LN (or a 6LR, or a 6LBR) accesses its Context Database 300 to retrieve the necessary context information (Step 2). Thereafter, the 6LN (or a 6LR, or a 6LBR) assembles the new ND message by piggybacking appropriate context information (Step 3). The new ND message is then transmitted (Step 4).

Further, an output of each of the dotted boxes discussed above waits for an incoming ND message (Step 7). If there is no message, the 6LN (or a 6LR, or a 6LBR) continues to wait for an incoming new ND message Step 8). If there is a message, the process is sent to Step 1 of the dotted box titled Receive an ND Message (Step 9).

Figure 4:
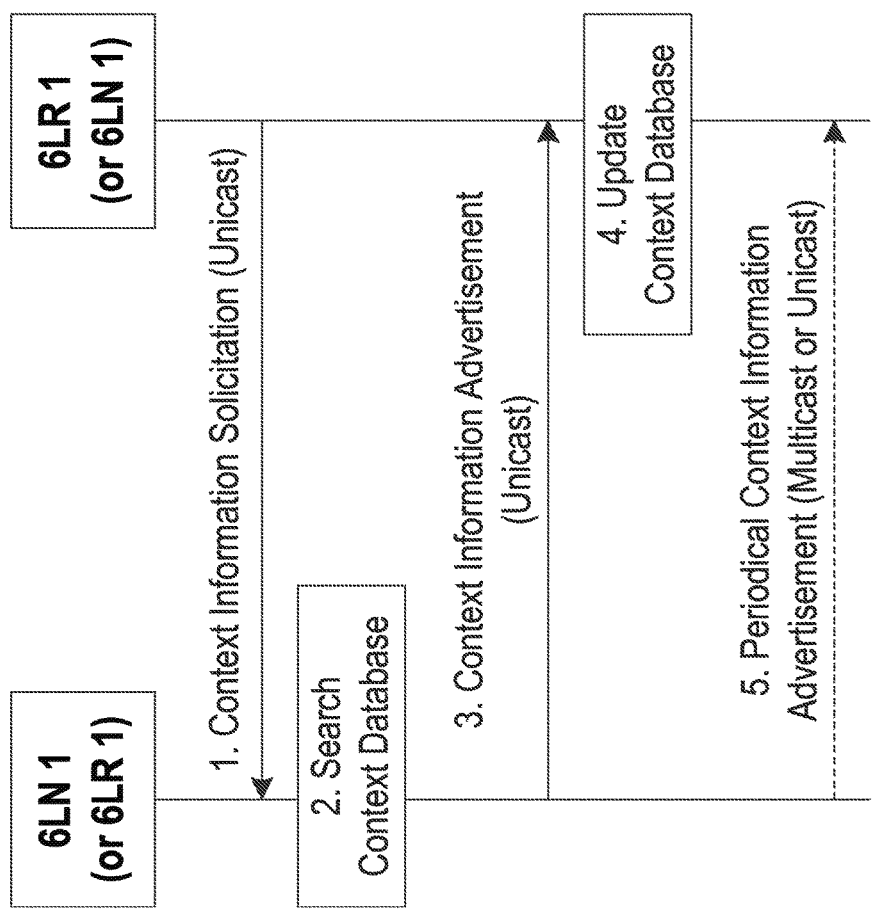
FIG. 4 illustrates an embodiment of a method of exchanging context information.

According to another embodiment, a method of exchanging context information via CIS/CIA messages is shown in FIG. 4. Each of the steps in FIG. 4 is represented by a number, e.g., 1. In Step 1, a 6LR1/6LN1 sends a CIS message to 6LN1/6LR1 to request specific context information. The message is unicast. In Step 2, the 6LN1/6LR1 searches the Context Database to retrieve the context information requested in Step 1. A CIA message is then generated containing the retrieved context information. In Step 3, the 6LN1/6LR1 sends a CIA message back to 6LR1/6LN1 to return the requested context information. The message is unicast. Thereafter, in Step 4, the 6LR1/6LN1 receives the CIA message and extracts the new context information from the CIA message, and updates its Context Database by adding the new context information. In a further embodiment as described in Step 5, the 6LN1/6LR1 may optionally broadcast the CIA message. The message is unicast. The message may include, for example, periodically updating 6LR1/6LN1 about its battery level.

Platforms

This application is intended to cover platform functionality and support for both application enablement platforms (AEPs) and connected device platforms (CDPs). AEPs include an application enablement layer and a service layer including the world wide web and Internet. The application enablement layer includes but is not limited to the following: (i) servicing Application Programming Interfaces (APIs), rules/scripting engine; (ii) SDK programming interface; and (iii) enterprise systems integration. The application enablement layer may also include value-added services including but not limited to discovery, analytics, context and events. The service layer including the world wide web and Internet may comprise, for example, analytics, billing, raw APIs, web service interfaces, semantic data models, device/service discovery, device management, security, data collection, data adaptation, aggregation, event management, context management, optimized connectivity and transport, M2M gateway, and addressing and identification. The CDPs may include connectivity analysis, usage analysis/reporting/alerts, policy control, automated provisioning, SIM activation/deactivation, and subscription Activation/Deactivation.

General Architecture

Figure 5A:
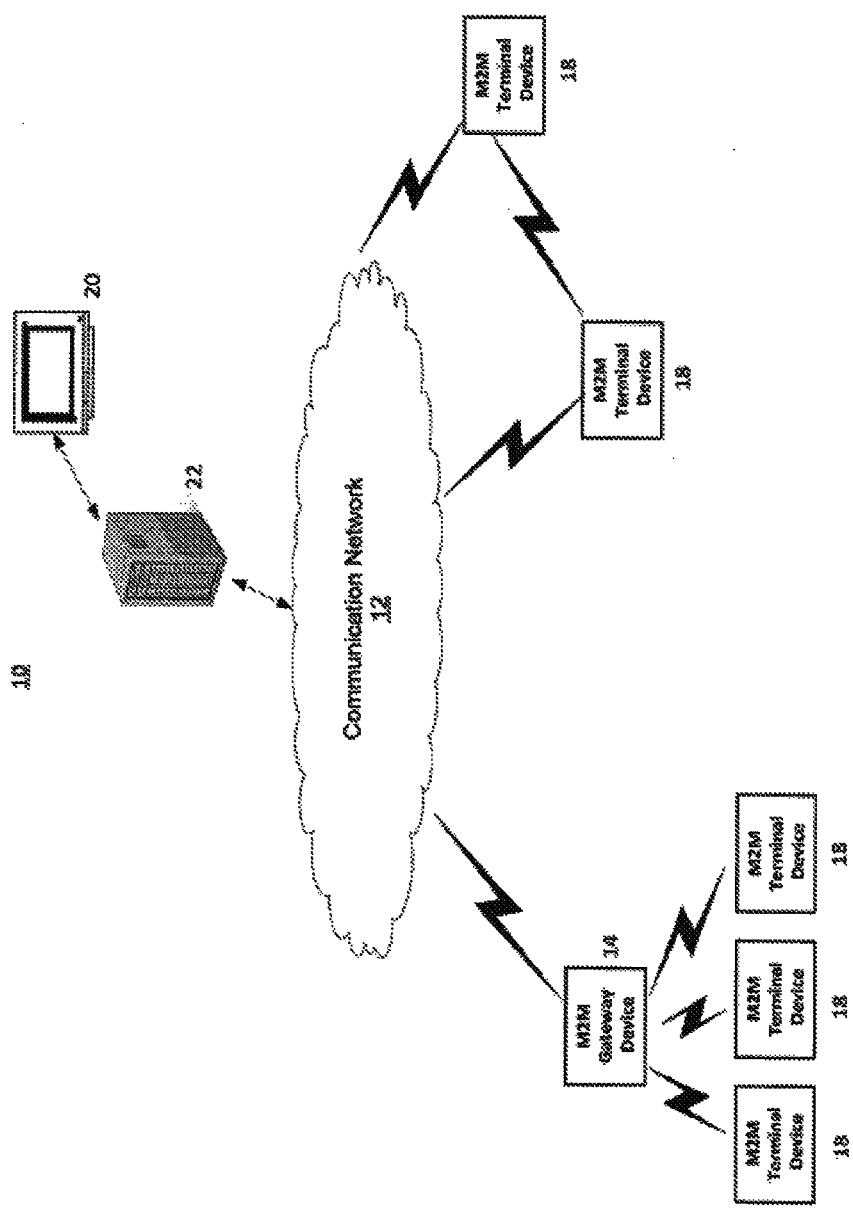
FIG. 5A illustrates a system diagram of an example machine-to-machine (M2M) or Internet of Things (IoT) communication system in which one or more disclosed embodiments may be implemented.

Prior to discussing the methods and apparatuses of this application in full detail, a brief description of a general architecture is provided. FIG. 5A is a diagram of an example machine-to machine (M2M), Internet of Things (IoT), or Web of Things (WoT) communication system 10 in which one or more disclosed embodiments may be implemented.

Generally, M2M technologies provide building blocks for the IoT/WoT, and any M2M device, gateway or service platform may be a component of the IoT/WoT as well as an IoT/WoT service layer, etc.

As shown in FIG. 5A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

The M2M/IoT/WoT communication system 10 may include an Infrastructure Domain and a Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. For example, the M2M gateway devices 14 may include a 6LR and LNBR and the M2M terminal devices 18 may include a 6LN. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. The information may be provided, for example, from the context database 300 as shown in FIG. 3. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Additionally, the M2M gateway devices 18 may be able to send and/or receive context information from the M2M service layer 22.

Figure 5B:
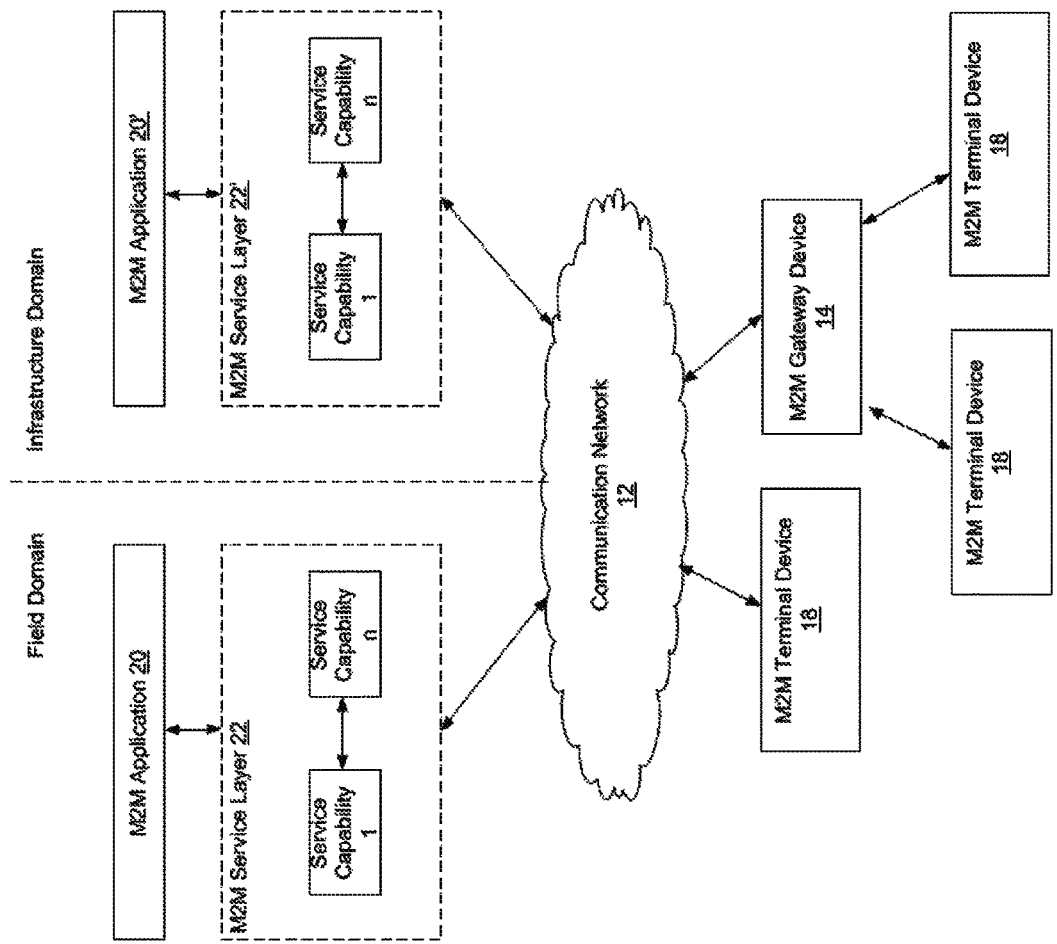
FIG. 5B illustrates a system diagram of an example architecture that may be used within the M2M/IoT communications system illustrated in FIG. 5A.

Referring to FIG. 5B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g. cloud/compute/storage farms, etc.) or the like.

Referring also to FIG. 5B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The service layer 22, 22' is a software middleware layer that supports value-added service capabilities through a set of Application Programming Interfaces (APIs) and underlying networking interfaces. Both ETSI M2M and one M2M define a service layer. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, the embodiments of the present application can be implemented as part of an M2M network that uses a Service Oriented Architecture (SOA) and/or a Resource-Oriented Architecture (ROA) to access services.

In some embodiments, M2M applications 20 may include desired applications that communicate retrieving sensory data with embedded semantic naming, as discussed herein. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geo-fencing, device/service discovery, and legacy systems integration, and provides these functions as services to the M2M applications 20.

Figure 5C:
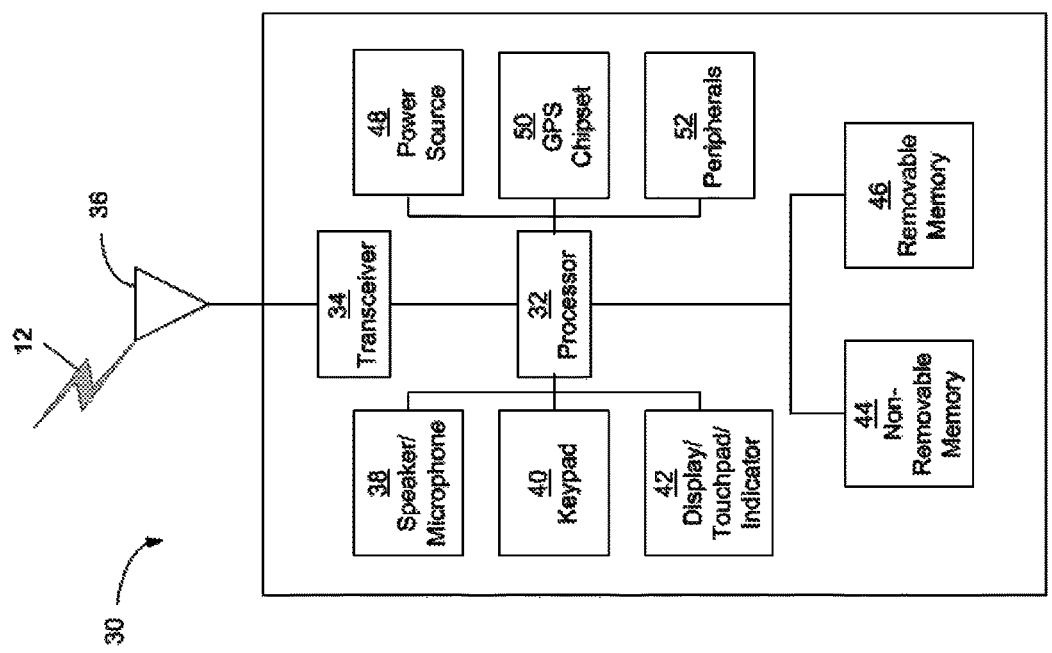
FIG. 5C illustrates a system diagram of an example M2M/IoT terminal or gateway device that may be used within the communications system illustrated in FIG. 5A.

FIG. 5C is a system diagram of an example M2M device 30, such as an M2M terminal device 18 or an M2M gateway device 14 for example. The M2M device 30 may be configured to send and receive messages including context information from a router. As shown in FIG. 5C, the M2M device 30 may include a processor 32, a transceiver 34, a transmit/receive element 36, a speaker/microphone 38, a keypad 40, a display/touchpad and/or indicator 42, non-removable memory 44, removable memory 46, a power source 48, a global positioning system (GPS) chipset 50, and other peripherals 52. In one embodiment, the M2M device 30 may be a 6LN, 6BR and/or a 6LBR. It will be appreciated that the M2M device 40 may include any sub-combination of the foregoing elements while remaining consistent with an embodiment. This device may be a device that uses the disclosed systems and methods for embedded semantics naming of sensory data.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 5C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 5C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 5D:
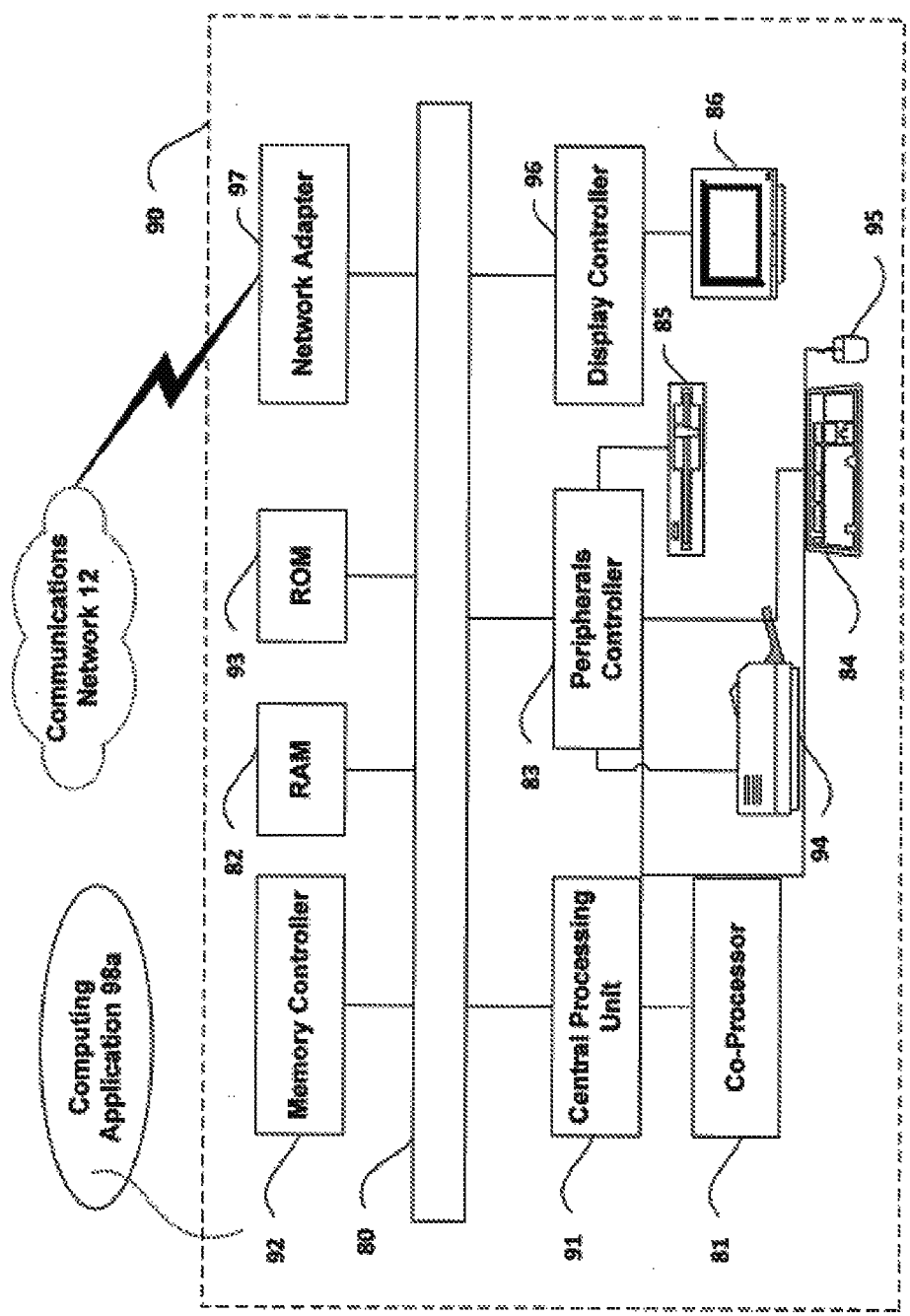
FIG. 5D is a block diagram of an example computing system in which aspects of the communication system of FIG. 5A may be embodied.

FIG. 5D is a block diagram of an exemplary computing system 90 on which, for example, the M2M service platform 22 of FIG. 5A and FIG. 5B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names.

Further, computing system 90 may contain network adaptor 97 that may be used to connect computing system 90 to an external communications network, such as network 12 of FIG. 5A and FIG. 5B.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Router Discovery

According to an aspect of the application, a method is described for discovering a node employing context information. For example, context-awareness may be employed during router discovery so that matching 6LNs and 6LRs may quickly be discovered. The proposed method helps reduce the number of steps generally necessary for locating matching routers, e.g., 6LRs. By so doing, latency, overhead and energy consumption are reduced. Namely, a 6LN may know the context information about 6LRs and can easily discover the appropriate and desired 6LRs to connect with. On the other hand, a 6LR may know the context information about 6LNs and can easily filter the desired 6LRs to provide them with IP connectivity.

Figure 6:
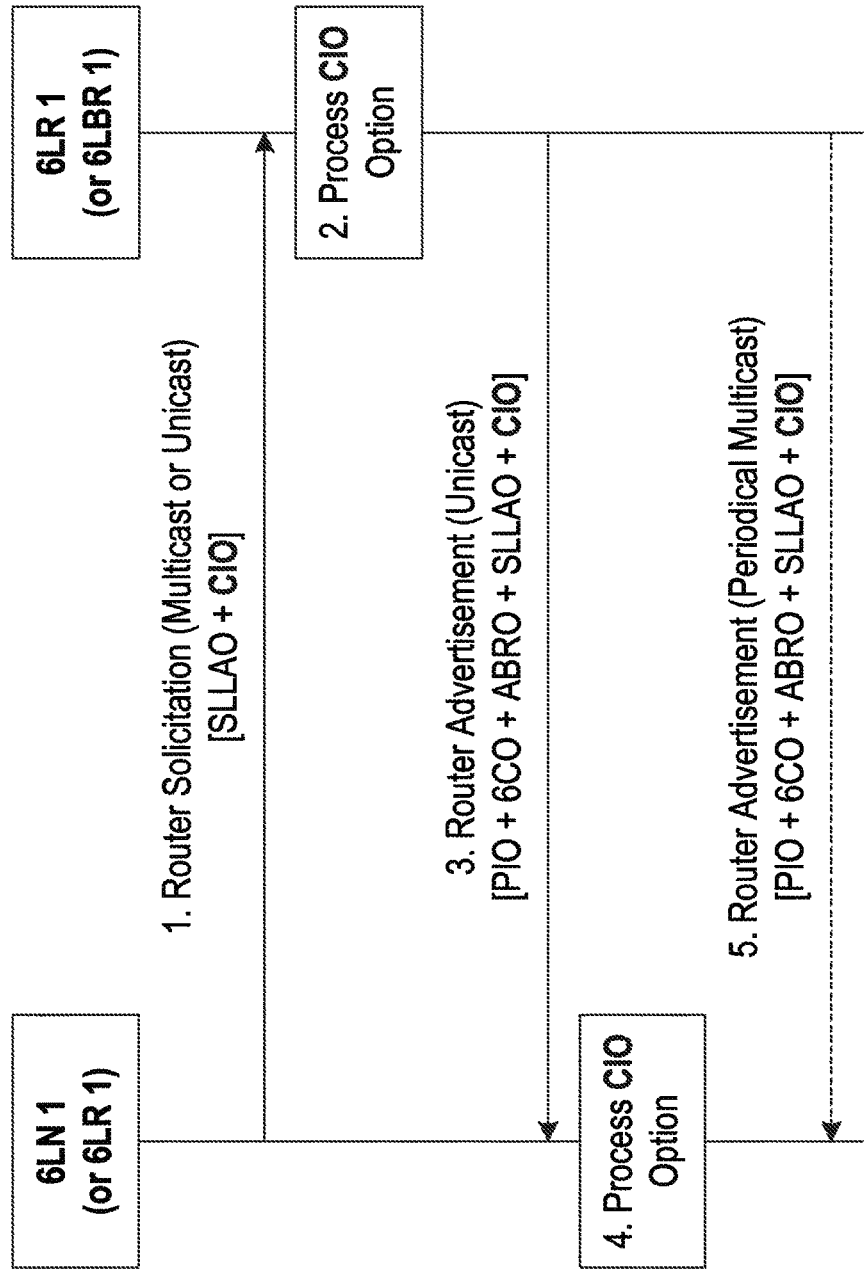
FIG. 6 illustrates an embodiment of a context-aware router discovery process.

In one embodiment as shown in FIG. 6, a timing sequence diagram is provided for context-aware router discovery. As depicted in FIG. 6, each step is referenced by a number, e.g., 1. In Step 1, a 6LN1/6LR1 sends a message to a 6LR1/6LBR1. The RS message, either in multicast or unicast, contains a source link layer address option (SLLAO) and a CIO option. Generally, the CIO contains context information. The context information may include but is not limited to supported services/functions at 6LN1, desired services/functions to be provided by one or more 6LRs, location information of 6LN1, location information of one or more desired 6LRs. 6LN1 retrieves context information from its Context Database, as shown above in FIG. 2, to prepare a RS message. In an exemplary embodiment, the 6LN1 may indicate "data aggregation" as a desired service to be provided by a 6LR.

As shown in Step 2, the 6LR1 receives the RS message sent by the 6LN1. The 6LR1 processes the contained CIO and may update its own Context Database such as shown in FIG. 2. That is context information about 6LN1 is added to 6LR1's Context Database. In one embodiment, the 6LR1 decides whether a RA message is needed. Namely, if 6LR1 does not support the desired services/functions as requested in the sent CIO, e.g., data aggregations function, etc., 6LR1 may opt not to send a RA message. Moreover if 6LR1's current location does not match the "location information of desired 6LRs," 6LR1 may opt not to send a RA message. In another example, if the supported services/functions at 6LN1 are not what 6LR1 desires in a node, 6LR1 may opt not to generate a RA message to send to the 6LN1. If a RA message is not needed, 6LR1 may discard the received RS message and wait for future RS messages.

In an alternative embodiment, the 6LR1 may send a message to the 6LN1 regardless of whether the 6LR1 desires to connect with it. This may assist the network, and preferably 6LN1 to generate a RS for another 6LR1 without waiting for a reply from the first 6LR1. In yet another alternative embodiment, if 6LR1 does not support the services requested by 6LN1 but is aware of a neighboring router that does, 6LR1 may opt to generate a RA message to tell 6LN1 that a "N-hop away router" supports the desired services/functions with N being an integer.

As described in Step 3, 6LR1 sends a RA message to 6LN1 upon reviewing the CIO accompanying the RS. The RA may also include a prefix information option (PIO), 6LoWPAN Context Option (6CO), an authoritative boarder router option (ABRO), and a SLLAO. The RA message may contain a few options in the CIO. For example, the CIO may contain context information such as supported services/functions at 6LR1, desired services/functions to be provided by 6LNs, location information of 6LR1, location information of desired 6LNs, maximum neighbors, current neighbors, etc. Basically, 6LR1 checks its Context Database to retrieve context information to be contained in the RA message. CIO in the RA message contains the context information of 6LR1.

The CIO sent to the 6LN1 in Step 3 may also contain "Next RA Time Information." This allows the 6LN1 to know exactly when 6LR1 will be sending the next RA message. Accordingly, 6LN1 may opt to stay in a power-saving or idle mode setting until the next RA is issued.

Step 4 describes the 6LN1 receiving and processing the RA message sent by the 6LR1. The 6LN1 extracts context information contained in the message. The 6LN1 may also update its Context Database by adding context information about 6LR1. At this stage, the 6LN1 may opt, based upon the context information contained in the RA message, to select 6LR1 as its default first-hop router. The 6LN1 may then continue to perform the address registration process with 6LR1. However, if 6LR1 indicates that it already has a high number of 6LNs attached, and the traffic load is high, the 6LN1 may choose to discover other more appropriate routers by sending another RS message, e.g., repeating Step 1. Moreover, if 6LR1 indicates that the quality of its upstream link to 6LBR1 is bad or inadequate, 6LN1 may also decide to choose other routers, e.g., repeating Step 1.

In a further embodiment, the 6LR1 may transmit a periodic multicast RA message containing CIO and similar context information to the 6LN1, e.g., Step 5. Generally, this RA message includes a PIO, 6CO, ABRO and CIO as similarly described above in Step 3.

Address Registration

According to another aspect of the present application, there is described a method of registering a node with a router. Namely, context information is piggybacked together with a NS/NA and/or Duplicate Address Request (DAR)/ Duplicate Address Confirmation (DAC) messages to improve address registration performance. "Registration Start Time" is employed in the context information to reduce rejected address registrations. In turn, it will save bandwidth and energy consumption at 6LNs and 6LRs. In addition, it also allows 6LNs the flexibility to perform address registration in advance, enter into power-saving mode, and immediately transmit packets when coming back to normal operation mode from power-saving mode. Such mechanism may reduce the address registration failure rate and protocol overhead, which in turn improves energy efficiency. This optimization is beneficial for constrained devices.

Figure 7:
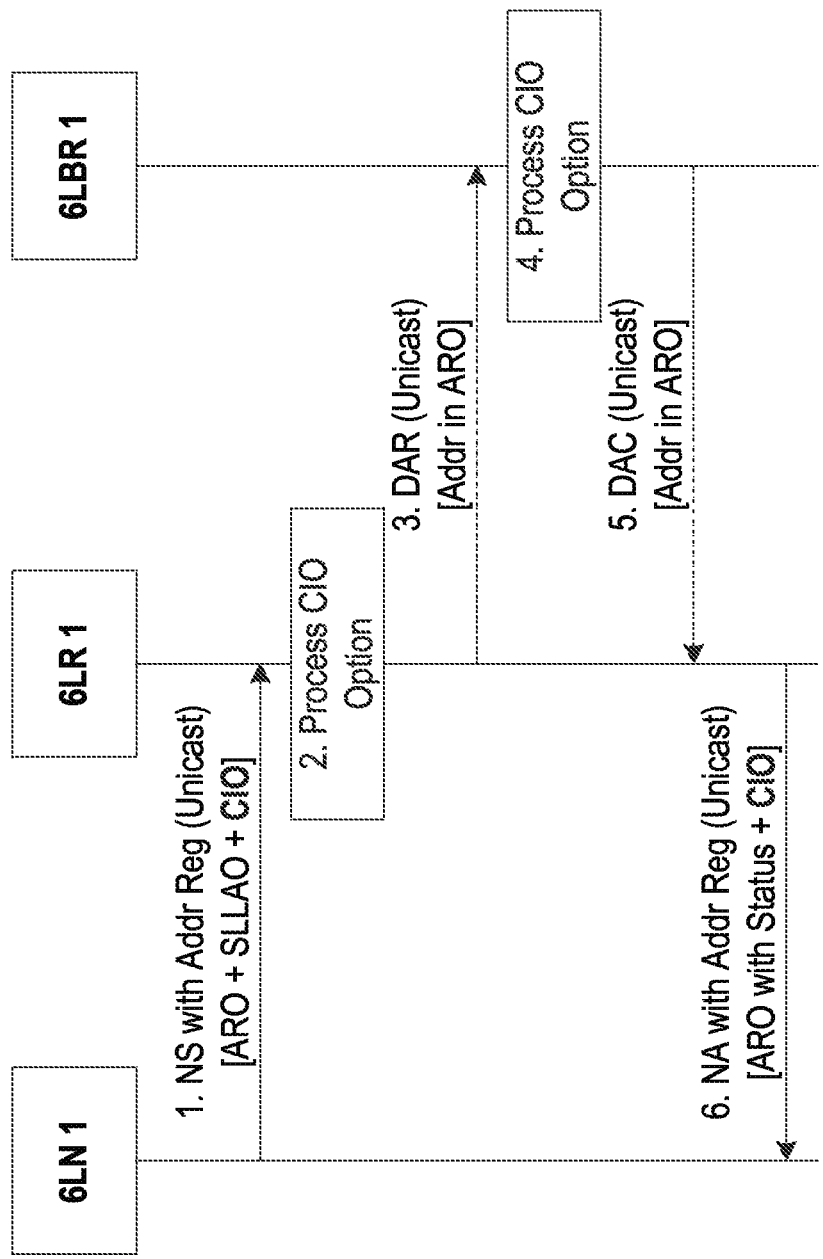
FIG. 7 illustrates an embodiment of a context-aware address registration process.

In one embodiment as shown in FIG. 7, the steps for context-aware address registration are described. The steps are referenced by a numeral, e.g., 1. In Step 1, a 6LN1 sends an NS message to a 6LR1. This message may contain a few options such as CIO, address registration option (ARO) and SLLAO. The CIO is obtained by the 6LN1 from its Context Database as shown in FIG. 2. The CIO contains context information as discussed in detail above. The existing address ARO generally includes a "Registration Lifetime." Registration Lifetime is understood to be the lifetime for the connection between the node and router.

In addition, a parameter called "Registration Start Time" may also be employed in the ARO or CIO option. Specifically, "Registration Start Time" is used to indicate exactly when the address registration will be taken into effect and when 6LN1 can start to use it. For example, if 6LN1 prefers to register its address immediately, e.g., in existing 6LoW-PAN, it sets "Registration Start Time" to zero. "Registration Start Time" can be encoded in different formats, e.g., the absolute time, a fraction or multiple of Registration Lifetime, etc. By so doing, this parameter gives more flexibility in address registration. This parameter may also be leveraged to reduce the number of rejected NS messages.

In an exemplary embodiment, 6LN1 could indicate a Registration Start Time, e.g., 5 minutes from now, in the NS message to tell 6LR1 that the address will not be utilized until 5 minutes later. If 6LR1's current neighbor cache is full but could have available space before the Registration Start Time, e.g., in 3 minutes, 6LR1 may intelligently accept 6LN1's address registration request. In addition, 6LN1 may enter into power-saving mode after receiving the NA message from 6LR1 by having this new parameter included in the NA message. Separately, if all available addresses have been registered in the 6LR1, it may assign a "Registration Start Time" to 6LN1 to approve 6LN1's address registration request for use sometime in the future. This may be based upon "Registration Lifetime" information of existing approved registrations.

In another embodiment, it is possible for the 6LN1 to perform a renewal before its lifetime expires. The 6LR1 may assign a Registration Start Time (>0) to the renewing registration. Alternatively, the 6LR1 may reject the renewal in advance for various reasons including but not limited to remaining neighbor cache space or to provide other 6LNs with the opportunity to register with the 6LR1. According to Step 2, the 6LR1 receives and processes the NS message contained in the CIO. The 6LR1 extracts the new context information from the CIO. It may then update its Context Database by adding the new context information.

In one embodiment as shown in Step 3, 6LR1 may optionally send a Duplicate Address Request (DAR) message toward 6LBR1 for duplicate address detection (DAD). The DAR message, preferably unicast, may contain CIO and ARO. In this optional step, the 6LR1 needs to access its Context Database to get corresponding context information and generate the DAR message. The CIO may contain the current location of 6LR1. This may be important if it has moved since its last communication with 6LBR1. If 6LBR1 finds that the first-hop neighbor of the 6LR1 toward 6LBR1 has changed, it may reject this address registration request by stating—This is a duplicate address—in a Duplicate Address Confirmation (DAC) message. In this case, 6LR1 may need to piggyback the IP address of its first-hop neighbor in the DAR message. Alternatively, if 6LBR1 has physical location information of all 6LRs, it can easily figure out if 6LR1's neighbor may have changed. In another embodiment, 6LR1 may indicate its current neighbor cache size, e.g., how many new addresses 6LR1 can accommodate, in the CIO. Accordingly, 6LBR1 can perform intelligent router delegation by delegating 6LNs to the 6LR which has a larger available neighbor cache size.

According to Step 4, 6LBR1 optionally receives the DAR message and processes the contained CIO option. It extracts the new context information from the CIO option and may accordingly update its Context Database by adding the new context information. According to Step 5, 6LBR1 optionally sends a DAC message back to 6LR1. The DAC message may contain CIO and corresponding context information.

According to Step 6, 6LR1 sends a NA message back to 6LN1. The NA message may contain CIO and corresponding context information. Generally, 6LBR1 needs to access its Context Database to get corresponding context information to generate the DAC message. The NA message may also contain the approved "Registration Start Time". If the approved "Registration Start Time" is equal to zero, the address will automatically be configured. Otherwise, if the approved "Registration Start Time" is non-zero, 6LN1 will trigger a timer with the value set to the approved "Registration Start Time" and it can then stay in power-saving or idle mode until the timer expires.

Address De-Registration

In yet another aspect of the application, a method of de-registering an address. Generally, a registered address becomes invalid after the "Registration Lifetime" in conventional 6LoWPAN ND protocols is disclosed. According to this application, a 6LR may wish to perform active address de-registration for one or more 6LNs in order to vacate more neighbor cache space for other 6LNs. For example, vacating may be premised upon certain 6LNs with higher priority. In another example, a 6LR may wish to reduce the number of connected 6LNs for purposes of mitigating congestion, saving energy, etc.

Moreover, de-registering may help increase the success rate of address re-registration and also optimize protocol overhead and energy efficiency for constrained devices. For example, de-registration may employ piggybacking context information to perform one or more steps including: (i) indicating "Next Registration Time" which may be leveraged by 6LNs to better perform re-registration; (ii) indicating a list of first-hop router candidates for 6LN1 to choose and attach to; and (iii) indicating de-registration reasons.

In another embodiment, context-aware address de-registration jointly performs address de-registration and router redirect in a single message. This may help to reduce protocol overhead and expedite the process for a 6LN to attach to a new 6LR.

Figure 8:
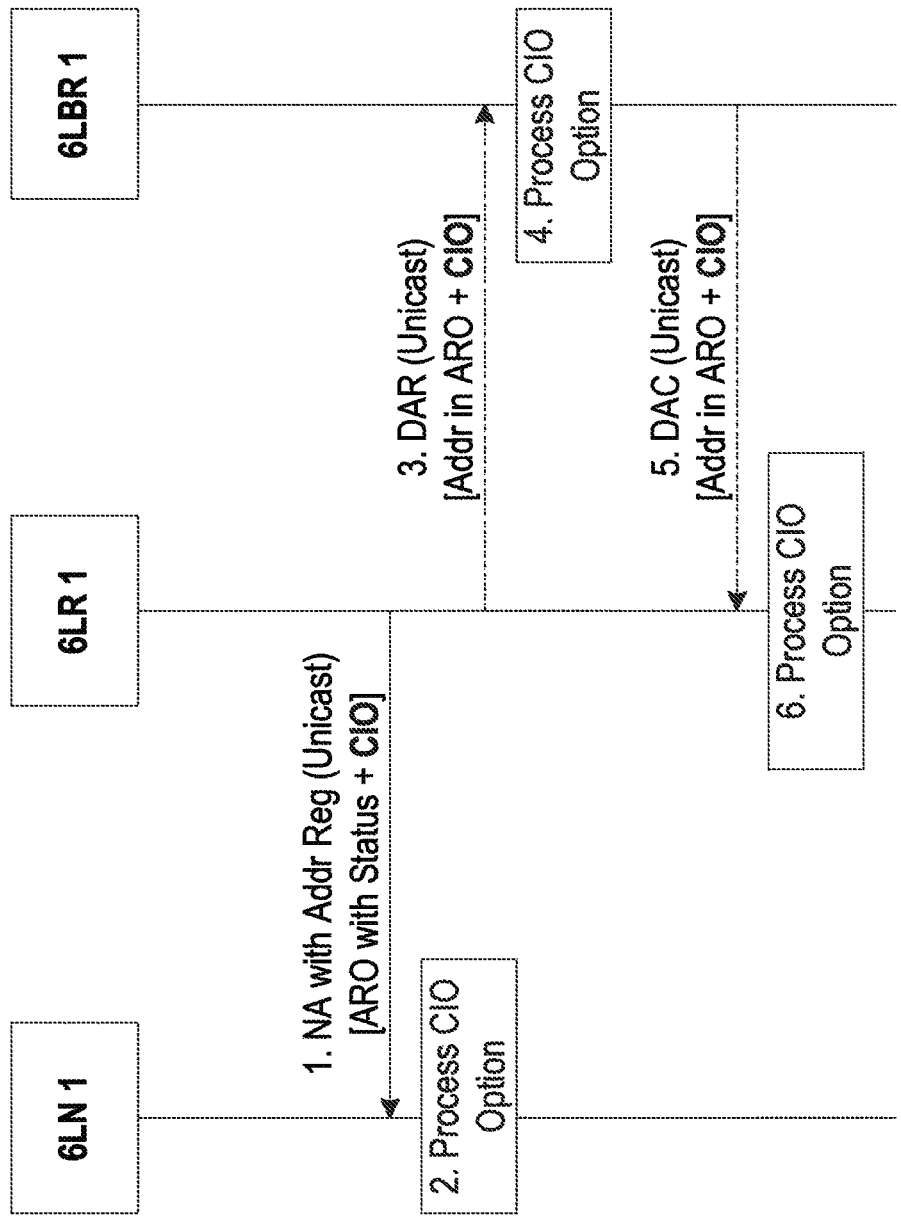
FIG. 8 illustrates an embodiment of a context-aware address de-registration process.

According to an embodiment as shown in FIG. 8, a context-aware address de-registration method is described where a 6LR may actively trigger address de-registration. Each of the steps in FIG. 8 is denoted by a number, e.g., 1. According to Step 1, a 6LR1 sends a NA message to 6LN1 to cancel an existing registration. This message may be triggered by one or more actions such as the expiration of the existing registration, vacating cache space for other more important 6LNs, and re-directing 6LN1 to another router.

The NA message may include an ARO with a status. The NA message may also include a CIO which contains context information from the context database of the 6LR1. The context information may include remaining battery life of 6LR1, traffic load at 6LR1, distance of hops to 6LBR1. These may all be viable reasons for performing de-registration.

In one embodiment, the NA message may include a TLLAO and Target IP address of the new 6LR to fulfill a router redirect function. In another embodiment, the CIO may also contain an option called "Next Registration Time." This option indicates the next time 6LN1 can make a re-registration with 6LR1. In other words, besides canceling the existing registration, 6LR1 can suggest an appropriate time for 6LN1 to perform re-registration. For example, 6LR1 may know when its neighbor cache could likely have space available based on "Registration Start Time" and "Registration Lifetime" for all registered 6LNs. As such, it may suggest "Next Registration Time" when its neighbor cache becomes available or exceeds a threshold. In another example, if 6LR1 needs to stay in power-saving mode for a while, it can suggest "Next Registration Time" as of the time it becomes available in normal operation mode. According to Step 2, the 6LN1 receives the NA message and processes the CIO option contained therein. Namely, the 6LN1 extracts the new context information from the CIO option and updates its Context Database accordingly.

In a further embodiment as shown in optional Step 3, the 6LR1 may access its context database and generate a DAR message. Subsequently, the 6LR1 sends the DAR message notifying 6LBR1 of the above-discussed de-registration. This message, preferably in Unicast, includes and Address in ARO in addition to a CIO. As described in Step 4, the 6LBR1 receives the DAR message and processes the contained CIO option. It extracts the new context information from CIO option and updates its Context Database by adding the new context information.

In yet a further embodiment, as shown in optional Step 5, the 6LBR1 accesses its Context Database to get corresponding context information to generate a DAC message. It then sends the DAC message, preferably in unicast, to the 6LR1. This message may contain the new CIO option. Subsequently, the 6LR1 receives the DAC message and processes the contained CIO option in Step 6. It extracts the new context information from CIO option and updates its Context Database by adding the new context information.

Router Delegation

According to yet another aspect of the application, a method is disclosed for delegating a message from a current 6LR to a target 6LR employing coordination and/or authentication. Namely, a 6LBR1 may determine whether a 6LN1 should use 6LR2 as its new first-default router. This may be attributed to reasons including but not limited to its original/current first-default router 6LR1 being congested, the 6LR2 having higher battery life, and the 6LR2 having a shorter path to 6LBR1.

Context-aware router delegation includes many advantages. At least one advantage is that a 6LBR1 may help select appropriate target 6LRs for the pair of a 6LN and its current 6LR. In addition, a current 6LR performs coordination with the target 6LR to get its approval prior to delegating a message. Moreover, delegation may actively be triggered by 6LBR1 or the current 6LR due to different events. For example, the current 6LR may be congested and/or a new 6LR becomes available and reachable to the 6LN.

Four new ICMP messages are proposed in accordance with the delegation aspect of this application. These messages include Delegation Notification, Delegation Request, Delegation Response, and Delegation Complete. The Delegation Notification is employed for 6LBR1 to coordinate and trigger router delegation. The Delegation Request and Delegation Response are employed for performing Router Delegation authentication between the current 6LR and the target 6LR. Delegation Complete is employed to facilitate the current 6LR to safely release relevant resources.

Figure 9:
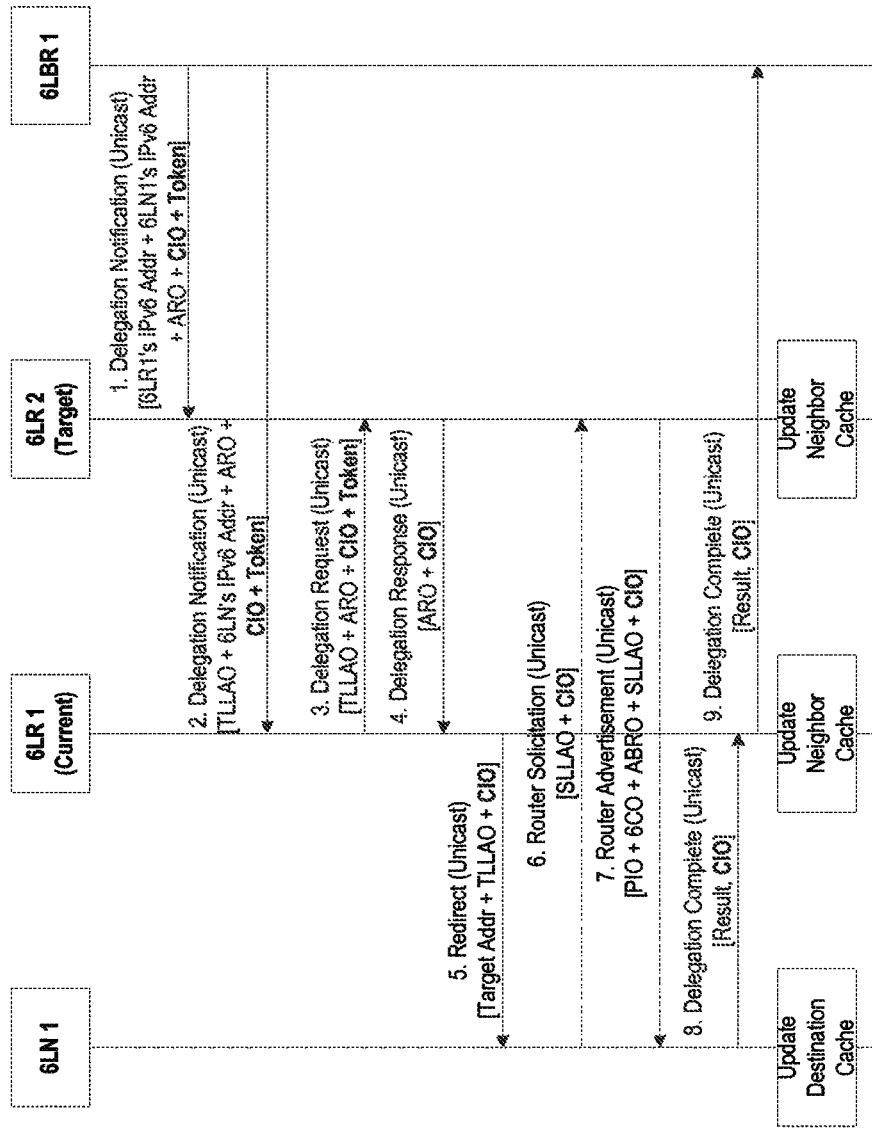
FIG. 9 illustrates an embodiment of a context-aware router delegation process.

Each of the Delegation messages will be discussed in more detail below with respect to the Context-Aware Router Delegation method shown in FIG. 9. In FIG. 9, each of the steps is denoted by a numeral, e.g., 1. According to Step 1, the 6LBR1 sends a Delegation Notification message, e.g., an ICMP message, to the target 6LR2. This message, preferably unicast, may contain a TLLAO, IPv6 address of 6LN1, IPv6 address of 6LR1, CIO, and a Delegation Token. The Delegation Token may have different forms. For example, the delegation token may be a hashed integer value based on IP addresses of 6LR1 and 6LR2. The Delegation Token may also be used by the 6LR2 to authenticate a Delegation Request as will be discussed below.

According to Step 2, the 6LBR1 sends a Delegation Notification Message, e.g., ICMP message, to the current 6LR1. This message may contain an IPv6 address of 6LN1, IPv6 address of 6LR2, CIO, and a Delegation Token.

After both delegation notification messages have been transmitted, Step 3 describes the current first-hop router, 6LR1, sending a Delegation Request message to the target 6LR2. This message may contain a TLLAO indicating the link layer address of 6LN1. The message may also contain an ARO which indicates the IP address of the 6LN1 and the Registration Lifetime. The CIO indicates context information about the 6LN1 and 6LR1. As discussed above, the context information includes supported functions or services, traffic load, etc. The approved "Registration Start Time" could be contained in the ARO or CIO. Such context information may be leveraged by the target 6LR2 to approve or reject the Delegation Request. For example, 6LR2 may reject the delegation request if the traffic load from 6LN1 is high and 6LR 2 does not have enough bandwidth to support it. In addition, the Delegation Request may include a Delegation Toke as discussed above in Steps 1 and 2. Importantly, target 6LR2 will confirm the Delegation Token received from 6LBR1 matches the token received from current 6LR1. If this Delegation Token is different, 6LR 2 will reject this Delegation Request in Step 3 (i.e. Redirect Request).

According to Step 4, 6LR2 sends a Delegation Response message back to 6LR1. This message, preferably in unicast, may contain an ARO and CIO option. 6LR2 may change the approved "Registration Start Time" and Registration Lifetime. 6LR2 may inform its 6LBR1 of the new "Registration Start Time" and Registration Lifetime using a DAR message including both parameters in the DAR message.

On the other hand, 6LR2 may reject the Delegation Request from 6LR1. For example, 6LR2 may not have enough neighbor cache space. In addition, 6LR2 may not have the desired functions or services to accommodate the needs of 6LN1. Moreover, 6LN1 may not have the desired services which 6LR2 expects. Also, current traffic at 6LR 2 may be too high to delegate. Also, 6LR2 may be moving. Further, 6LR2 may be battery-powered and has low residual energy.

In another embodiment, Step 5 may be employed if delegation is accepted by 6LR2. Here, 6LR1 or 6LR 2 may send a Redirect message to 6LN1. This message may contain a CIO with supported services/functions of 6LR2. The message may also include updated "Registration Start Time" and Registration Lifetime information in the ARO or CIO. In an alternative embodiment, 6LN1 may opt not to accept the delegation from 6LR2. This may be feasible if the supported services are not adequate for 6LN1.

According to Step 6, 6LN1 may optionally send a unicast RS message to 6LR 2. This is done to verify 6LR2's existence. This message may contain the new CIO option and SLLAO. According to Step 7, 6LR2 sends a unicast RA message to 6LN1 as a response. This message may contain the new CIO option, a PIO, 6CO, ABRO and SLLAO. Then 6LR 2 updates its neighbor cache by adding 6LN1.

In yet another embodiment as described in Step 8, 6LN1 sends a Delegation Complete message, preferably in unicast, to 6LR1 informing it of the completion of router delegation. This message may contain the new CIO option. This message may also contain a delegation result, e.g., success or failure. 6LN1 updates its destination cache by deleting 6LR1 and adding 6LR 2. 6LR1 will update its neighbor cache by deleting 6LN1 after receiving this message. In a further embodiment as described in Step 9, 6LR1 forwards a received Delegation Complete message to 6LBR1.

According to the present application in even a further embodiment, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 4 and 6-9. The computer executable instructions may be stored in a memory and executed by a processor disclosed above in FIGS. 1C and 1D, and employed in devices including but not limited to IoT devices, routers, and gateways within LAN/PAN networks. In one embodiment, a computer-implemented device having a non-transitory memory and processor operably coupled thereto, as described above in FIGS. 1C and 1D, is disclosed. Specifically, the non-transitory memory has instructions stored thereon for discovering a router on a network. The processor is configured to perform the instructions of: (i) determining to discover the router on the network; and (ii) sending a message including context information to the router.

While the methods, systems and software applications have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An endpoint device comprising:
   a non-transitory memory having instructions stored thereon for discovering a router on a network; and
   a processor, operatively coupled to the memory, the processor configured to perform the instructions of:
   determining to discover the router on the network; and
   sending a message including context information to the router.

2. The apparatus of claim 1, wherein the context information includes one or more of supported services on the endpoint device, supported functions on the endpoint device, desired services from a router, and desired functions from the router.

3. The apparatus of claim 1, wherein the processor is further configured to perform the instructions of receiving a message from the router including router context information.

4. The apparatus of claim 1, wherein the processor is further configured to perform the instructions of determining whether to add the router context information to a database.

5. The apparatus of claim 1, wherein the processor is further configured to perform the instructions of selecting the router as a default router based on context information.

6. The apparatus of claim 5, wherein the processor is further configured to perform the instructions of sending a second message to the router including information selected from registration start time, registration lifetime and combinations thereof.

7. The apparatus of claim 6, wherein the processor is further configured to perform the instructions of receiving a message from the router indicating address registration.

8. The apparatus of claim 1, wherein the processor is further configured to perform the instructions of receiving an address de-registration or cancelation message from the router.

9. The apparatus of claim 6, wherein the processor is further configured to perform the instructions of receiving a delegation redirect message in unicast from the router including context information of a second router.

10. The apparatus of claim 1, wherein the message from the router is a multicast message.

11. The apparatus of claim 1, further comprising: a transceiver.

12. A computer-implemented method for discovering a router on a network comprising:
    determining to discover the router on the network;
    sending a message including context information to the router; and
    receiving a message from the router including router context information,
    wherein the context information includes one or more of supported services on an endpoint device and supported functions on the endpoint device.

13. The method of claim 12, wherein the context information further includes one or more of desired services from a router, and desired functions from a router.

14. The method of claim 12, further comprising:
    determining whether to add the router context information to a database.

15. The method of claim 14, further comprising:
    selecting the router as a default router based on context information.

16. The method of claim 15, further comprising:
    sending a second message to the router including information selected from registration start time, registration lifetime and combinations thereof.

17. The method of claim 16, further comprising receiving a message from the router indicating address registration.

18. The method of claim 12, further comprising:
    receiving an address de-registration or cancelation message from the router.

19. The method of claim 12, further comprising:
    receiving a delegation redirect message in unicast from the router including context information of a second router.

20. The method of claim 12, further comprising:
    sending a message in unicast to the router agreeing to delegation to the second router.

* * * * *